US011757574B2

(12) United States Patent
Jeon et al.

(10) Patent No.: US 11,757,574 B2
(45) Date of Patent: Sep. 12, 2023

(54) COMMUNICATIONS SIGNAL RETRANSMISSIONS USING STATUS REPORTS

(71) Applicant: SAMSUNG ELECTRONICS CO., LTD., Suwon-si (KR)

(72) Inventors: Kyungjae Jeon, Suwon-si (KR); Seongjoon Kim, Busan (KR); Youngtaek Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 16/991,658

(22) Filed: Aug. 12, 2020

(65) Prior Publication Data

US 2021/0075550 A1     Mar. 11, 2021

(30) Foreign Application Priority Data

Aug. 12, 2019   (KR) ........................ 10-2019-0098345

(51) Int. Cl.
*H04L 1/00*          (2006.01)
*H04L 1/1812*      (2023.01)
(Continued)

(52) U.S. Cl.
CPC .......... *H04L 1/1812* (2013.01); *H04L 1/1685* (2013.01); *H04L 1/1809* (2013.01); *H04L 1/1848* (2013.01); *H04W 28/04* (2013.01)

(58) Field of Classification Search
CPC ... H04L 1/1812; H04L 1/1685; H04L 1/1809; H04L 1/1848; H04L 1/1628;
(Continued)

(56) References Cited

U.S. PATENT DOCUMENTS 8,225,163 B2 *   7/2012   Lee ........................ H04L 1/1845
                                                        714/748
8,270,348 B2 *   9/2012   Chun ..................... H04L 1/1854
                                                        370/328

(Continued)

FOREIGN PATENT DOCUMENTS

JP              6481711         3/2019
KR          10-1368499       2/2014
(Continued)

*Primary Examiner* — Kyle Vallecillo
*Assistant Examiner* — Osman M Alshack
(74) *Attorney, Agent, or Firm* — F. Chau & Associates, LLC

(57) ABSTRACT

A communications system, a method of operating a communications system, and a method of operating a communications device are provided. The communications system includes a transmitter configured to transmit a data packet to a receiver; and the receiver configured to receive the data packet from the transmitter, wherein the receiver is configured to receive at least one first packet from the transmitter, determine whether there is a first failed packet having an error from among the at least one first packet, transmit a first status report requesting retransmission of the first failed packet, and transmit a second status report requesting retransmission of the first failed packet within a previously determined status report processing period from transmission of the first status report, wherein the first status report comprises first time information corresponding to a transmission time of the first status report from the receiver to the transmitter, and the second status report comprises second time information corresponding to a transmission time of the second status report from the receiver to the transmitter.

8 Claims, 14 Drawing Sheets

(51) Int. Cl.
*H04L 1/1809* (2023.01)
*H04W 28/04* (2009.01)
*H04L 1/1607* (2023.01)
*H04L 1/1829* (2023.01)

(58) Field of Classification Search
CPC ... H04L 1/1678; H04L 1/1829; H04L 1/1867; H04L 1/1864; H04W 28/04
USPC .................................................. 714/748–750
See application file for complete search history.

(56) References Cited

U.S. PATENT DOCUMENTS

| | | | | |
|---|---|---|---|---|
| 8,526,440 | B2* | 9/2013 | Ho | H04L 1/1628 370/341 |
| 9,961,581 | B2* | 5/2018 | Bathwal | H04W 72/14 |
| 10,396,942 | B2* | 8/2019 | Baek | H04W 28/0278 |
| 10,601,554 | B2* | 3/2020 | Zhang | H04L 1/189 |
| 10,784,987 | B2* | 9/2020 | Marinier | H04L 1/0065 |
| 10,805,836 | B2* | 10/2020 | Yu | H04L 5/0053 |
| 2004/0148396 | A1* | 7/2004 | Meyer | H04L 1/1883 709/227 |
| 2005/0058154 | A1* | 3/2005 | Lee | H04L 1/0066 370/473 |
| 2008/0219204 | A1* | 9/2008 | Lee | H04L 1/1812 370/315 |
| 2008/0294958 | A1* | 11/2008 | Lee | H04L 1/1614 714/748 |
| 2012/0102216 | A1* | 4/2012 | Cui | H04L 1/1621 709/232 |
| 2012/0201219 | A1* | 8/2012 | Wager | H04L 1/1812 370/329 |
| 2012/0281564 | A1* | 11/2012 | Zhang | H04L 1/1867 370/252 |
| 2013/0229906 | A1* | 9/2013 | Akkarakaran | H04W 28/04 370/216 |
| 2014/0126551 | A1* | 5/2014 | Nammi | H04L 1/1819 370/336 |
| 2015/0006988 | A1* | 1/2015 | Kim | H04L 1/18 714/749 |
| 2015/0124719 | A1* | 5/2015 | Lim | H04L 1/1812 370/329 |
| 2015/0222407 | A1* | 8/2015 | Nammi | H04B 7/0413 370/336 |
| 2016/0182388 | A1* | 6/2016 | Tsuruoka | H04L 47/283 370/315 |
| 2017/0288820 | A1* | 10/2017 | Kela | H04L 1/1874 |
| 2018/0041311 | A1* | 2/2018 | Werner | H04L 1/1858 |
| 2018/0145703 | A1* | 5/2018 | Li | H04L 1/0045 |
| 2018/0159660 | A1* | 6/2018 | Jia | H04L 1/0041 |
| 2018/0241459 | A1* | 8/2018 | Song | H04W 28/14 |
| 2018/0337763 | A1* | 11/2018 | Shi | H04L 1/1854 |
| 2020/0076541 | A1* | 3/2020 | Kim | H04L 1/08 |
| 2020/0336255 | A1* | 10/2020 | Wong | H04W 72/1268 |
| 2021/0075550 | A1* | 3/2021 | Jeon | H04L 1/1628 |

FOREIGN PATENT DOCUMENTS

| | | |
|---|---|---|
| KR | 10-1467798 | 11/2014 |
| KR | 10-1514069 | 4/2015 |
| KR | 10-2017-0084579 | 7/2017 |
| KR | 10-2017-0113355 | 10/2017 |
| KR | 10-2017-0121668 | 11/2017 |

* cited by examiner

COMMUNICATIONS SIGNAL RETRANSMISSIONS USING STATUS REPORTS

CROSS-REFERENCE TO RELATED APPLICATION

This application claims priority under 35 U.S.C. § 119 to Korean Patent Application No. 10-2019-0098345, filed on Aug. 12, 2019 in the Korean Intellectual Property Office, the disclosure of which is incorporated by reference herein in its entirety.

TECHNICAL FIELD

Exemplary embodiments of the present inventive concept relate to a communications devices, systems, and operating methods thereof; and more particularly, to a communications device for performing retransmission of failed transmissions using status reports.

DISCUSSION OF RELATED ART

Automatic Repeat reQuest (ARQ) refers to a group of error-control protocols for data transmission that generally use acknowledgements, which are messages sent by the receiver indicating that it has correctly received a data packet, and timeouts, which are specified periods of time allowed to elapse before an acknowledgment is expected to be received, to achieve reliable data transmission over an unreliable service.

Common types of ARQ protocols include Stop-and-wait ARQ, Go-Back-N ARQ, and Selective Repeat ARQ/Selective Reject ARQ. Such ARQ protocol types are used for detecting and retransmitting failed packets. Using ARQ as such, when a failed packet is detected, information regarding the error packet is output to a transmitter through a status report. Based on the status report, the transmitter checks the error packet and retransmits the error packet to a receiver. A status report prohibition period is enforced after each status report is transmitted, during which the receiver is prohibited from sending a next status report even if another failed packet is detected.

Hybrid Automatic Repeat reQuest (HARQ) denotes a combination of high-rate forward error-correcting coding and ARQ error-control. HARQ may reduce temporal latency of an upper layer by adding channel coding to the ARQ. HARQ is used in various mobile communication standards such as high-speed packet access (HSPA) and long-term evolution (LTE).

SUMMARY

Exemplary embodiments of the inventive concept provide a communications device, system and method for transmitting a subsequent status report regarding a subsequently detected failed packet that was detected during a previous status report processing period after the receiver transmitted a previous status report.

According to an exemplary embodiment of the inventive concept, a method is provided for operating a communications system having a receiver, the method including receiving, by the receiver, at least one first packet; transmitting, by the receiver, a first status report requesting retransmission of a first failed packet from among the at least one first packet, and initiating a first processing period for the first status report; receiving, by the receiver, at least one second packet during the first processing period; and transmitting, by the receiver during the first processing period, a second status report requesting retransmission of a second failed packet from among the at least one second packet, wherein the first processing period includes a historical or expected processing period based on a difference between receipt of the at least one first packet and receipt of the at least one second packet, wherein the first processing period terminates upon the earlier of the expected processing period to complete retransmission of the first failed packet to the receiver or the actual receipt of the retransmitted first failed packet by the receiver.

According to an exemplary embodiment of the inventive concept, a method is provided for operating a communications device, the method including sequentially transmitting, by a transmitter, a first packet unit and a second packet unit; receiving, by the transmitter, a first status report requesting retransmission regarding a first failed packet having an error from among at least one first packet comprised in the first packet unit; receiving, by the transmitter, a second status report requesting retransmission regarding a second failed packet having an error from among at least one second packet comprised in the second packet unit; and retransmitting, by the transmitter, the first failed packet and the second failed packet, based on first time information comprised in the first status report and second time information comprised in the second status report.

According to an exemplary embodiment of the inventive concept, a communications system is provided including a transmitter configured to transmit a data packet to a receiver; and the receiver configured to receive the data packet from the transmitter, wherein: the receiver is configured to receive at least one first packet from the transmitter, determine whether there is a first failed packet having an error from among the at least one first packet, transmit a first status report requesting retransmission of the first failed packet, and transmit a second status report requesting retransmission of the first failed packet within a previously determined status report processing period from transmission of the first status report, wherein the first status report comprises first time information corresponding to a transmission time of the first status report from the receiver to the transmitter, and the second status report comprises second time information corresponding to a transmission time of the second status report from the receiver to the transmitter.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION

Exemplary embodiments of the inventive concept relate to a device, system and method usable with a modified ARQ-type protocol where information regarding a subsequently failed packet from a transmitter to a receiver is output by the receiver in a subsequent status report during the pendency of a previous status report processing period, which may have been previously known in the art as a status report prohibition period. Although wireless exemplary embodiments are shown and described, the present inventive concept is not limited thereto, and may similarly be applied over congested or noisy wired (e.g., electrical telegraphy) and/or hybrid communications networks in addition to the wireless communications network examples described herein. In the present disclosure, singular forms such as 'a', 'an' and 'the' are intended to include the plural forms.

Figure 1:
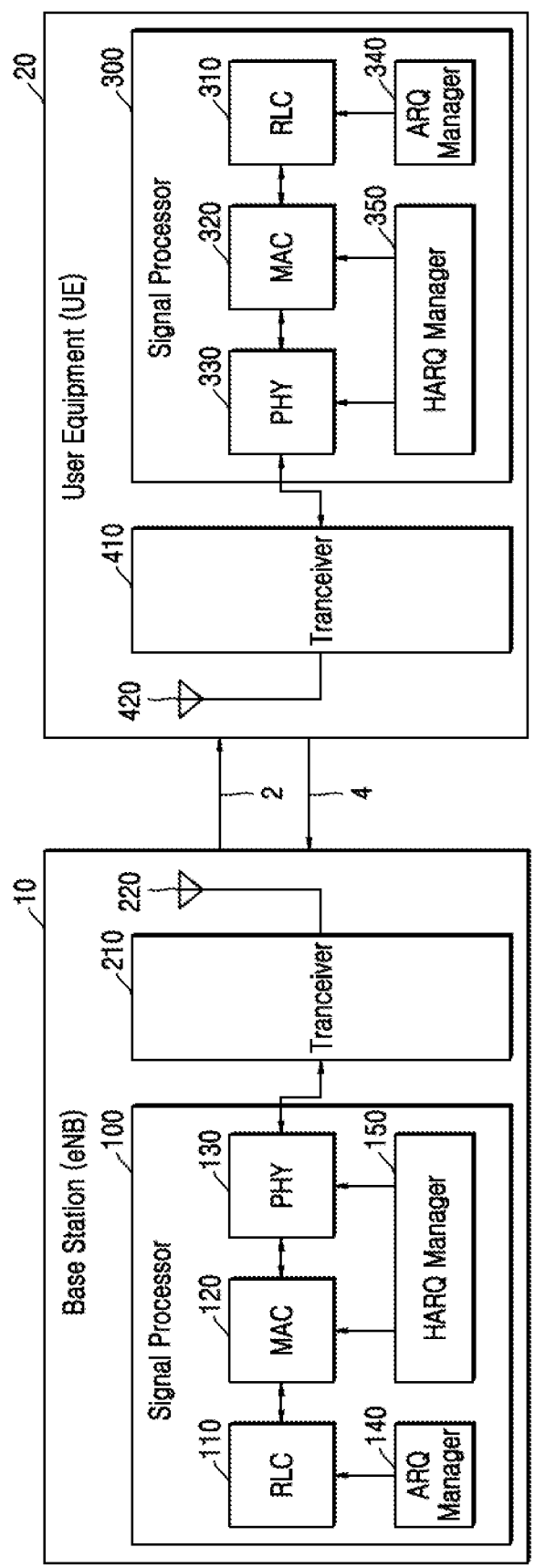
FIG. 1 is a schematic block diagram showing a communications system according to an exemplary embodiment.

FIG. 1 illustrates a wireless communications system 1 according to an exemplary embodiment.

The communications system 1 may include, as non-limiting examples, a $5^{th}$ generation (5G) wireless system, a long term evolution (LTE) system, an LTE-Advanced system, a code division multiple access (CDMA) system, a global system for mobile communications (GSM), a wireless local area network (WLAN) system, or any other communications system. Although the communications system 1 is described below mainly with reference to a 5G system and/or an LTE system, it shall be understood that embodiments are not limited thereto.

The communications system 1 may include a base station (BS) 10 and user equipment (UE) 20. The BS 10 may generally refer to a fixed, fixed-trajectory or reference area station for communicating with user equipment and/or another BS, and may exchange data and control information by communicating with user equipment and/or another BS. For example, the BS 10 may be called a Node B, an evolved-Node B (eNB), a sector, a site, a base transceiver system (BTS), an access point (AP), a relay node, a remote radio head (RRH), a radio unit (RU), a small cell, a predominant transmitter, or the like. The BS 10 or a cell described herein may be interpreted with a generic meaning indicating some areas or functions covered by a base station controller (BSC) in CDMA, a Node-B in wideband code division multiple access (WCDMA), an eNB or a sector (site) in LTE, or the like, and may cover all the various coverage areas such as megacell, macrocell, microcell, picocell, femtocell, relay node, RRH, RU, and small cell communication range.

The UE 20, which is communications equipment, may be fixed or be mobile and may refer to various types of equipment capable of transmitting and receiving data and/or control information by communicating with the BS 10. For example, the UE 20 may be called terminal equipment, a mobile station (MS), a mobile terminal (MT), a user terminal (UT), a subscriber station (SS), a wireless device, a handheld device, a predominant receiver, or the like.

A communications network between the UE 20 and the BS 10 may support communication between a plurality of users by sharing available network resources. For example, in a wireless communications network, information may be delivered by various multiple access methods such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, OFDM-CDMA, or the like.

As shown in FIG. 1, the UE 20 and the BS 10 may communicate with each other via an uplink (UL) 4 and a downlink (DL) 2. In the communications system such as an LTE system or an LTE-Advanced system, the UL 4 and the DL 2 may transmit control information via a control channel such as a Physical Downlink Control Channel (PDCCH), a Physical Control Format Indicator Channel (PCFICH), a Physical Hybrid Automatic Repeat Request (ARQ) Indicator Channel (PHICH), a Physical Uplink Control Channel (PUCCH), an Enhanced Physical Downlink Control Channel (EPDCCH), or the like, and may transmit data via a data channel such as a Physical Downlink Shared Channel (PDSCH), a Physical Uplink Shared Channel (PUSCH), or the like. In some embodiments, control information may be transmitted using an enhanced PDCCH or extended PDCCH (EPDCCH).

Referring to FIG. 1, the BS 10 may include a signal processor 100, a transceiver 210 connected to the signal processor, and an antenna 220 connected to the transceiver. In an exemplary embodiment, the transceiver 210 may include a filter, a mixer connected to the filter, a power amplifier (PA) connected to the mixer, and a low noise amplifier (LNA) connected to the PA. The transceiver 210 may transmit a signal via the antenna 220 and the DL 2. For example, the transceiver 210 may shift a signal provided from the signal processor 100 from a baseband into a radio frequency (RF) band, for example, via the mixer, and may amplify a shifted signal, for example, via the PA, and provide the amplified signal to the antenna 220. Also, the transceiver 210 may process a signal received via the UL 4 and the antenna 220, and may provide a processed signal to the signal processor 100. For example, the transceiver 210 may amplify a signal received via the antenna 220, such as via the LNA, may shift an amplified signal from an RF band into a baseband, such as via the mixer, and may provide the shifted signal to the signal processor 100.

The signal processor 100 may include a radio link control (RLC) block 110, a medium access control (MAC) block 120 connected to the RLC block 110, a physical (PHY) block 130 connected to the MAC block 120, an ARQ manager 140 connected to the RLC block 110, and a Hybrid Automatic Repeat reQuest (HARQ) manager 150 connected to the MAC block 120 and the PHY block 130. The RLC block 110, the MAC block 120, and the PHY block 130 may perform operations corresponding to an RLC layer, a MAC layer, and a physical or PHY layer of the communications system 1, respectively. The RLC block 110 may perform ARQ retransmission. For example, the RLC block 110 may perform an ARQ operation, or the like, by restructuring a packet data convergence protocol (PDCP) packet data unit (PDU) in a proper size, and may rearrange the order of RLC PDUs reversed during a HARQ process performed by the MAC block 120.

The MAC block 120 may perform logic-channel multiplexing, HARQ retransmission, scheduling of the UL 4 and the DL 2, carrier aggregation (CA) control, or the like. For the DL 2, the PHY block 130 may receive a transport block from the MAC block 120 and may perform cyclic redundancy correction (CRC) insertion, encoding, rate matching, scrambling, modulation, antenna mapping, or the like. Although shown as being separate in FIG. 1, in alternate embodiments, at least two of the RLC block 110, the MAC block 120, and the PHY block 130 may be implemented as a single unit. Although not specifically depicted in FIG. 1, the signal processor 100 may further include a PDCP block, where the PDCP block may perform operations such as Internet Protocol (IP) header compression/restoration, ciphering/deciphering, or the like.

The ARQ manager 140 may perform an ARQ operation by controlling the RLC block 110. For example, when the BS 10 operates as a receiver of a packet, the ARQ manager 140 may detect a failed packet among received packets by controlling the RLC block 110, and may generate information regarding the detected failed packet in a form of status report. The ARQ manager 140 may output the generated status report to the UE 20 by controlling the RLC block 110, the MAC block 120, and the PHY block 130. Based on the status report, the UE 20 may perform retransmission regarding the failed packet.

When the BS 10 operates as a transmitter of a packet, the ARQ manager 140 may retransmit a failed packet by controlling the RLC block 110 based on the received status report.

The HARQ manager 150 may perform a HARQ operation by controlling the MAC block 120 and the PHY block 130. For example, the HARQ manager 150 may repeatedly transmit Acknowledged (ACK)/Not Acknowledged (NACK) signals with respect to packets received using a data channel.

When the signal processor 100 requests retransmission regarding a failed packet according to a status report, the signal processor 100 may not transmit a status report without time information even though the signal processor 100 detects a failed packet during a status report processing period in which no status report is produced for a certain period of time to prevent duplicate retransmission.

When the signal processor 100 according to an exemplary embodiment operates as a receiver of a packet, the signal processor 100 may transmit a status report in spite of the status report processing period when the signal processor 100 detects a failed packet. In an exemplary embodiment, the signal processor 100 may transmit a status report, including time information corresponding to a system time in which the status report is transmitted.

In an exemplary embodiment, in a case where the signal processor 100 operates as a transmitter of a packet, when the signal processor 100 receives a status report, the signal processor 100 may merge a previously received status report with a recently received status report based on time information and may retransmit a failed packet based on the merged status report, thereby preventing duplicate transmission regarding the failed packet.

As shown in FIG. 1, the UE 20 may include a signal processor 300, a transceiver 410, and an antenna 420. The transceiver 410 may receive a signal via the DL 2 and the antenna 420 and may transmit a signal via the antenna 420 and the UL 4.

In a similar way to the BS 10, the signal processor 300 of the UE 20 may include an RLC block 310, a MAC block 320 connected to the RLC block 310, a PHY block 330 connected to the MAC block 320, an ARQ manager 340 connected to the RLC block 310, and a HARQ manager 350 connected to the MAC block 320 and the PHY block 330; and the RLC block 310, the MAC block 320, and the PHY block 330 may perform operations corresponding to an RLC layer, a MAC layer, and a PHY layer of the communications system 1, respectively. The ARQ manager 340 may perform an ARQ operation by controlling the RLC block 310.

For example, when the UE 20 operates as a receiver of a packet, the ARQ manager 340 may detect a failed packet among received packets by controlling the RLC block 310 and may generate information regarding the detected failed packet in a form of a status report. The ARQ manager 340 may output the generated status report to the BS 10 by controlling the RLC block 310, the MAC block 320, and the PHY block 330, and based on the status report, the BS 10 may perform retransmission regarding the failed packet. When the UE 20 operates as a transmitter of a packet, the ARQ manager 340 may retransmit a failed packet by controlling the RLC block 310 based on the received status report.

Operations of the ARQ manager 340 may be the same as or similar to those of the ARQ manager 140 included in the BS 10, and thus, duplicate description thereof is omitted.

Figure 2:
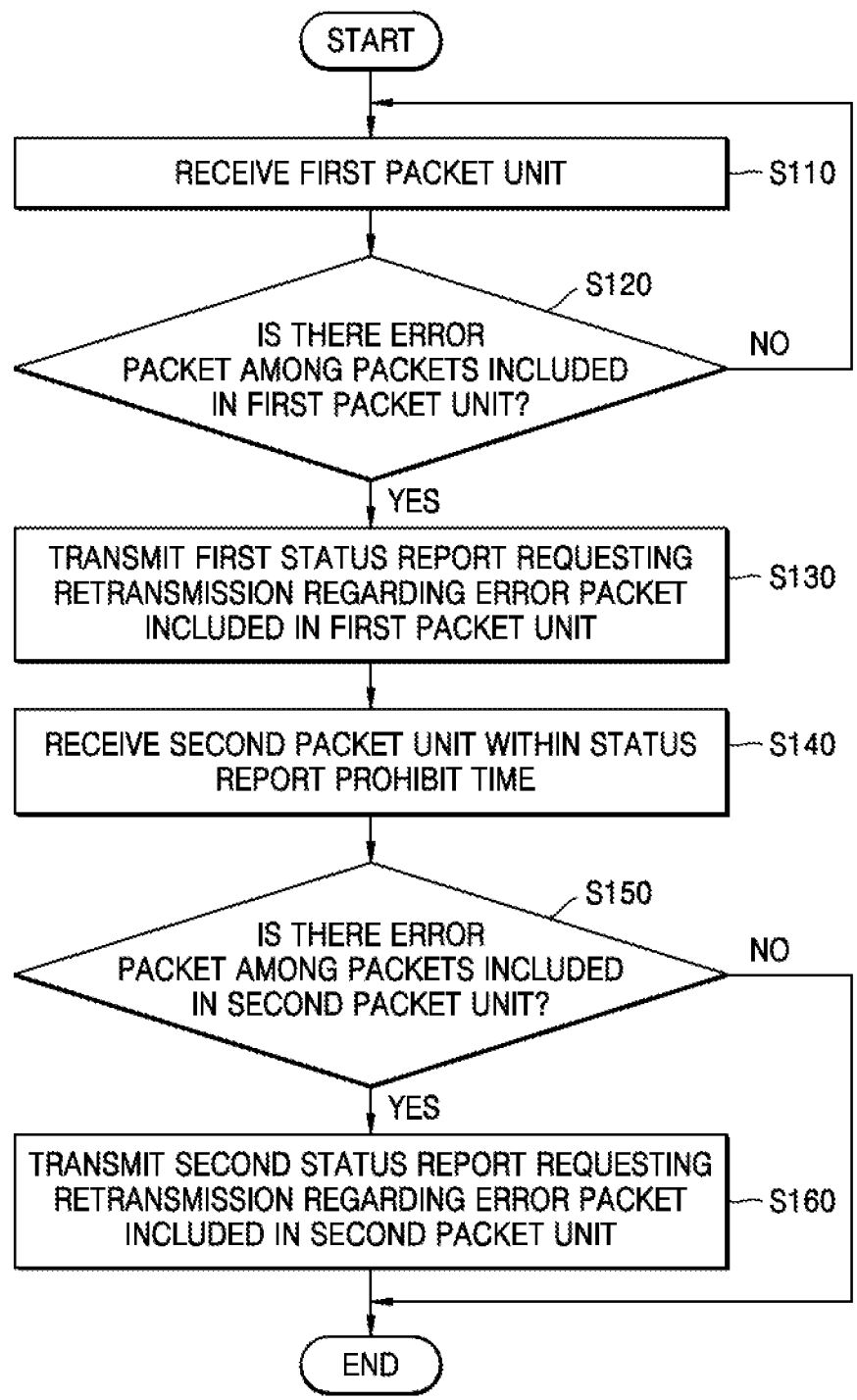
FIG. 2 is a flowchart diagram showing a method of operating a communications device, according to an exemplary embodiment.

FIG. 2 illustrates a method of operating a communications device, according to an exemplary embodiment. Specifically, FIG. 2 is a diagram showing an ARQ operation in a case where a communications device serves as a receiver of a packet.

Referring to FIG. 2, a communications device (for example, the BS 10 or the UE 20 of FIG. 1) may receive a first packet unit from a transmitter at operation S110. A packet unit described herein may include a plurality of packets. The communications device may determine whether or not there is a failed packet among packets included in the first packet unit at operation S120. The failed packet described herein may refer to a packet that fails to be received, a packet that fails to be corrected using error correction (for example, error correcting code (ECC)), or the like. The failed packet may alternatively be referred to as an error packet, When there is a failed packet in the first packet unit, the communications device may transmit a first status report requesting retransmission regarding the failed packet included in the first packet unit to a transmitter at operation S130. In an exemplary embodiment, the communications device may incorporate time information corresponding to a time in which the first status report is transmitted and information regarding the failed packet into the first status report. When there is no failed packet in the first packet unit, the communications device may receive a new packet unit.

When the communications device receives a second packet unit within the status report processing period, which may have been previously called a status report prohibit time or a status report prohibition period, at operation S140, a determination as to whether or not there is a failed packet among packets included in the second packet unit may be made at operation S150. In an example, the status report processing period may be determined as the period of time since the first status report is transmitted until a previously determined time elapses.

When there is a failed packet among packets included in the second packet unit, the communications device may transmit a second status report requesting retransmission regarding the failed packet included in the second packet unit to the transmitter even within the status report processing period at operation S160. In an exemplary embodiment, the communications device may incorporate time information corresponding to a time in which the second status report is transmitted and information regarding the failed packet into the second status report.

When a communications device according to the inventive concept detects a failed packet, the communications device may re-receive the failed packet quickly by transmitting a status report requesting retransmission regarding the failed packet in spite of the status report processing period, and signal transmitting and receiving latency may decrease.

Figure 3:
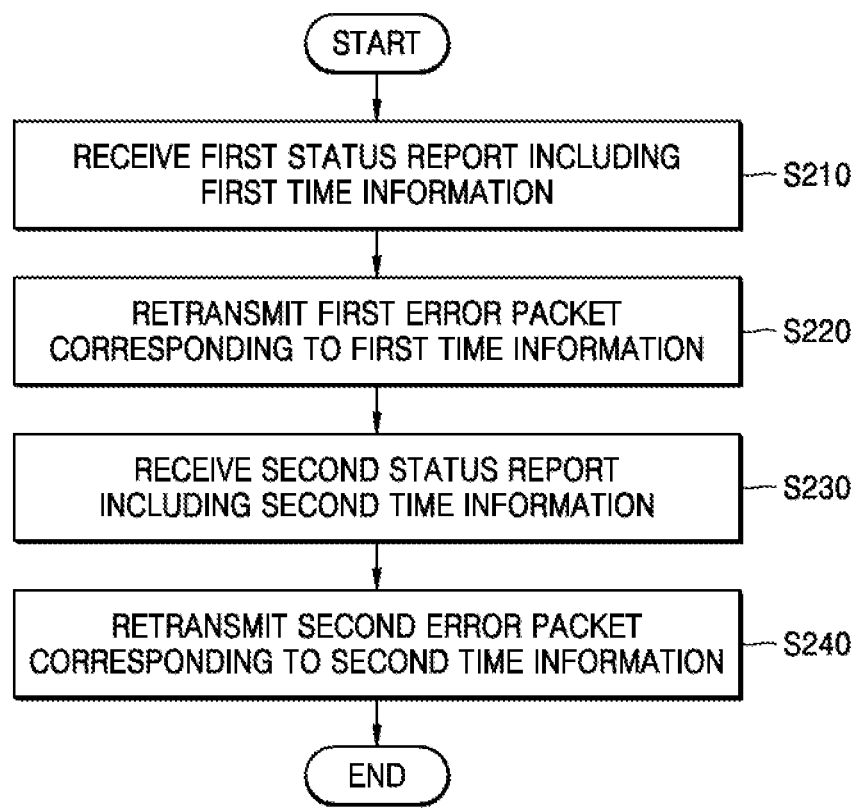
FIG. 3 is a flowchart diagram showing a method of operating a communications device, according to an exemplary embodiment.

FIG. 3 illustrates a method of operating a communications device, according to an exemplary embodiment. Specifically, FIG. 3 is a diagram showing an operation of retransmitting a failed packet based on a status report in a case where a communications device serves as a transmitter of a packet.

Referring to FIG. 3, a communications device, such as, for example, the BS 10 or the UE 20 of FIG. 1, may receive a first status report including first time information at operation S210. In response to the first status report, the communications device may retransmit a first failed packet corresponding to the first time information at operation S220. The communications device may receive a second status report including second time information at operation S230. The communications device may retransmit a second failed packet corresponding to the second time information in response to the second status report at operation S240.

In an example, the communications device may determine, based on the first time information and the second time information, whether the second status report has occurred or not within the status report processing period starting from the first status report. When the second status report has occurred within the status report processing period, the communications device may generate a new status report after excluding a duplicate request among the first status report and the second status report.

In an example, the communications device may determine, based on the first time information and the second time information, whether failed packet retransmission according to the second status report has already been performed or not, and when failed packet retransmission according to the second status report has not already been performed, the communications device may generate a new status report after excluding a duplicate request among the first status report and the second status report.

A communications system according to an exemplary embodiment may incorporate corresponding time information into a status report and may retransmit a failed packet based on the time information. Accordingly, even though a status report is transmitted regardless of the status report processing period, a communications device receiving the status report may schedule a failed packet to be transmitted based on time information, and as a result, duplicate transmission of the failed packet may be prevented, and latency of signal transmission and reception may be reduced.

Figure 4:
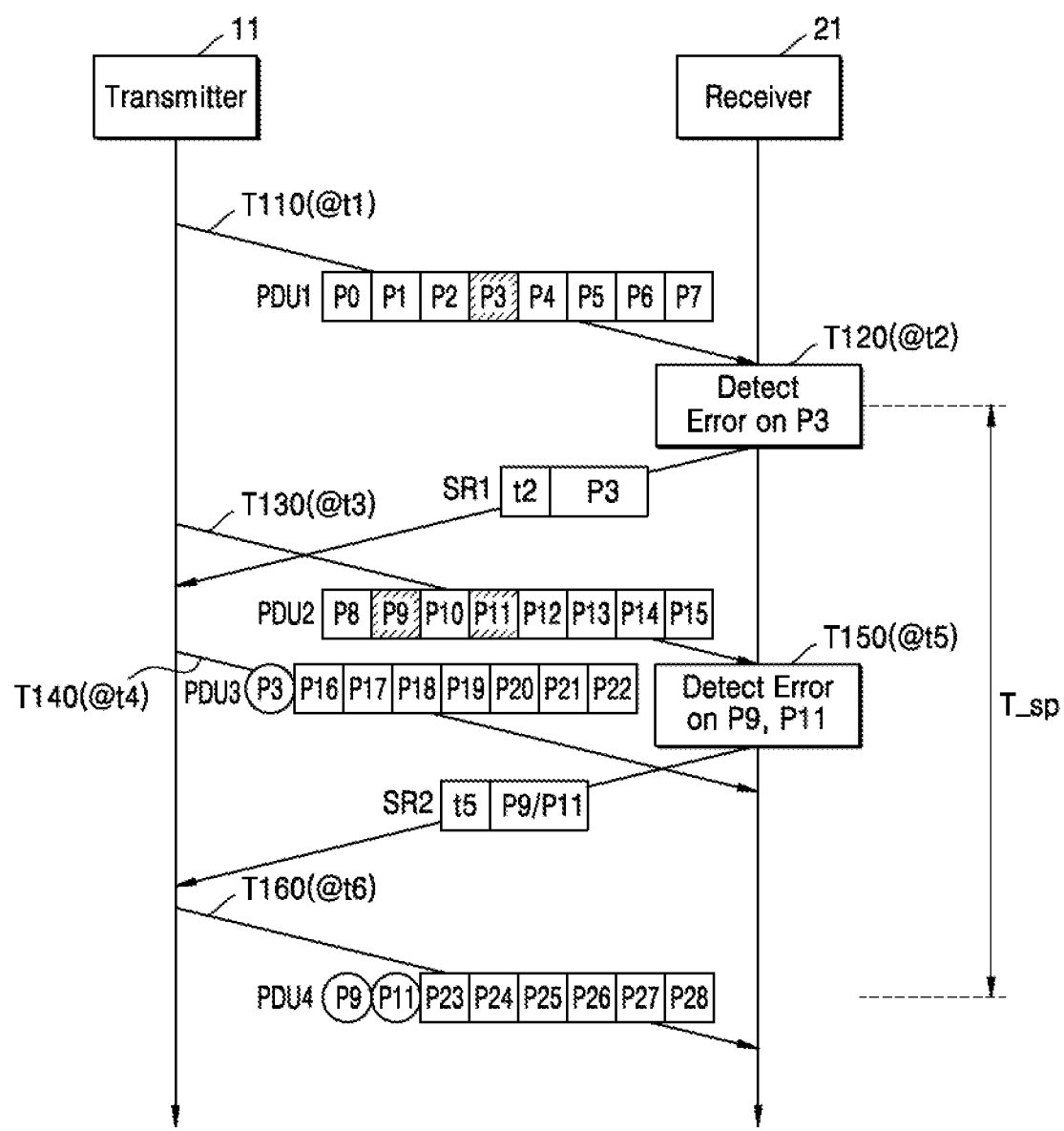
FIG. 4 is a hybrid timing diagram showing a method of operating a communications system, according to an exemplary embodiment.

FIG. 4 illustrates a method of operating a communications system, according to an exemplary embodiment. Specifically, FIG. 4 is a diagram showing a method in which a transmitter 11 and a receiver 21 included in a communications system perform an ARQ operation according to a chronological order. Duplicate description of FIGS. 2 and 3 is omitted.

Referring to FIG. 4, at a first system time t1, the transmitter 11 may transmit a first packet unit PDU1 to the receiver 21 at process time T110. The first packet unit PDU1 may include a first packet PO to an eighth packet P7. At a second system time t2, the receiver 21 may receive the first packet unit PDU1 and may detect an error in the fourth packet P3 of the received first packet unit PDU1 at process time T120. The receiver 21 may transmit a first status report SR1 requesting retransmission regarding the fourth packet P3 to the transmitter 11, and the first status report SR1 may include information regarding the second system time t2 corresponding to a system time in which the first status report SR1 is transmitted.

At a third system time t3, the transmitter 11 may transmit a second packet unit PDU2 to the receiver 21 at process time T130. The second packet unit PDU2 may include a ninth packet P8 to a sixteenth packet P15. At a fourth system time t4, the transmitter 11 may receive the first status report SR1, and in response to the first status report SR1, may retransmit the fourth packet P3 to the receiver 21 by incorporating the fourth packet P3 required for retransmission into a third packet unit PDU3 at process time T140.

At a fifth system time t5, the receiver 21 may receive the second packet unit PDU2 and may detect errors in the tenth packet P9 and the twelfth packet P11 of the received second packet unit PDU2 at process time T150. The fifth system time t5 may be included in a status report processing period T_sp determined as a previously determined period of time starting from the second system time t2 at which the first status report SR1 is output. Although the fifth system time t5 is included in the status report processing period T_sp, the receiver 21 may transmit a second status report SR2 requesting retransmission regarding the tenth packet P9 and the twelfth packet P11 to the transmitter 11, and the second status report SR2 may include information regarding the fifth system time t5 corresponding to a system time in which the second status report SR2 is transmitted.

At a sixth system time t6, the transmitter 11 may receive the second status report SR2, and in response to the second status report SR2, may retransmit the tenth packet P9 and the twelfth packet P11 to the receiver 21 by incorporating the tenth packet P9 and the twelfth packet P11 required for retransmission into the fourth packet unit PDU4 at process time T160.

Figure 5:
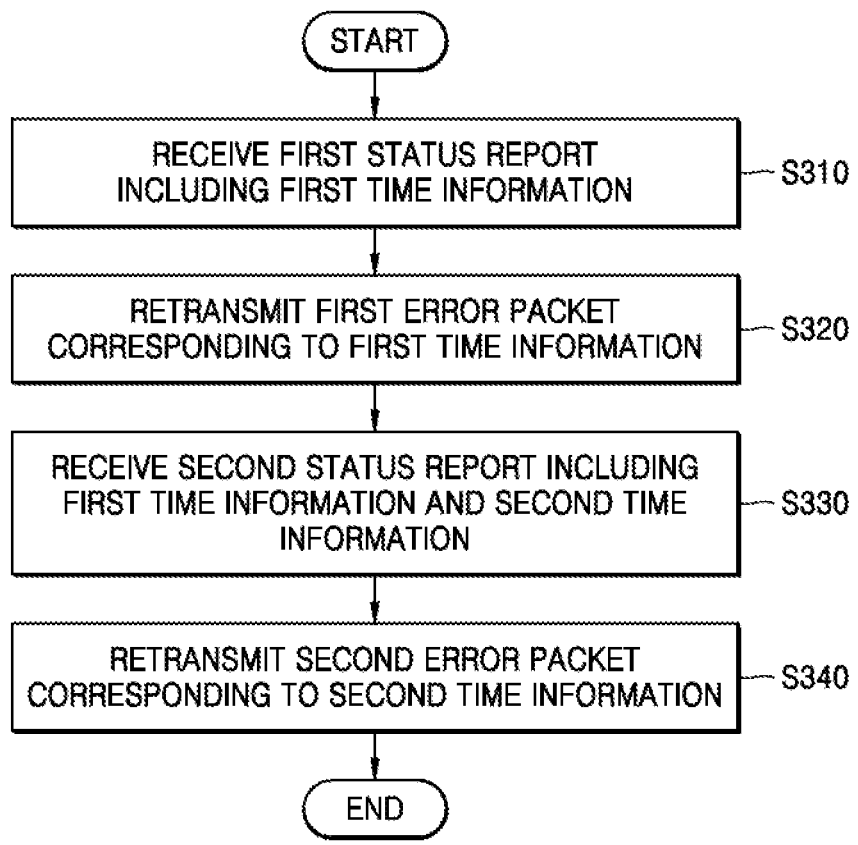
FIG. 5 is a flowchart diagram showing a method of operating a communications device, according to an exemplary embodiment.

FIG. 5 illustrates a method of operating a communications device, according to an exemplary embodiment. Specifically, FIG. 5 is a diagram showing an operation of retransmitting a failed packet based on a status report in a case where a communications device serves as a transmitter of a packet.

Referring to FIG. 5, a communications device, such as, for example, the BS 10 or the UE 20 of FIG. 1, may receive a first status report including first time information at operation S310. In response to the first status report, the communications device may retransmit a first failed packet corresponding to the first time information at operation S320. The communications device may receive a second status report including the first time information and second time information at operation S330. Because the failed packet corresponding to the first time information has already been retransmitted, the communications device may retransmit only a second failed packet corresponding to the second time information in response to the second status report at operation S340.

Figure 6:
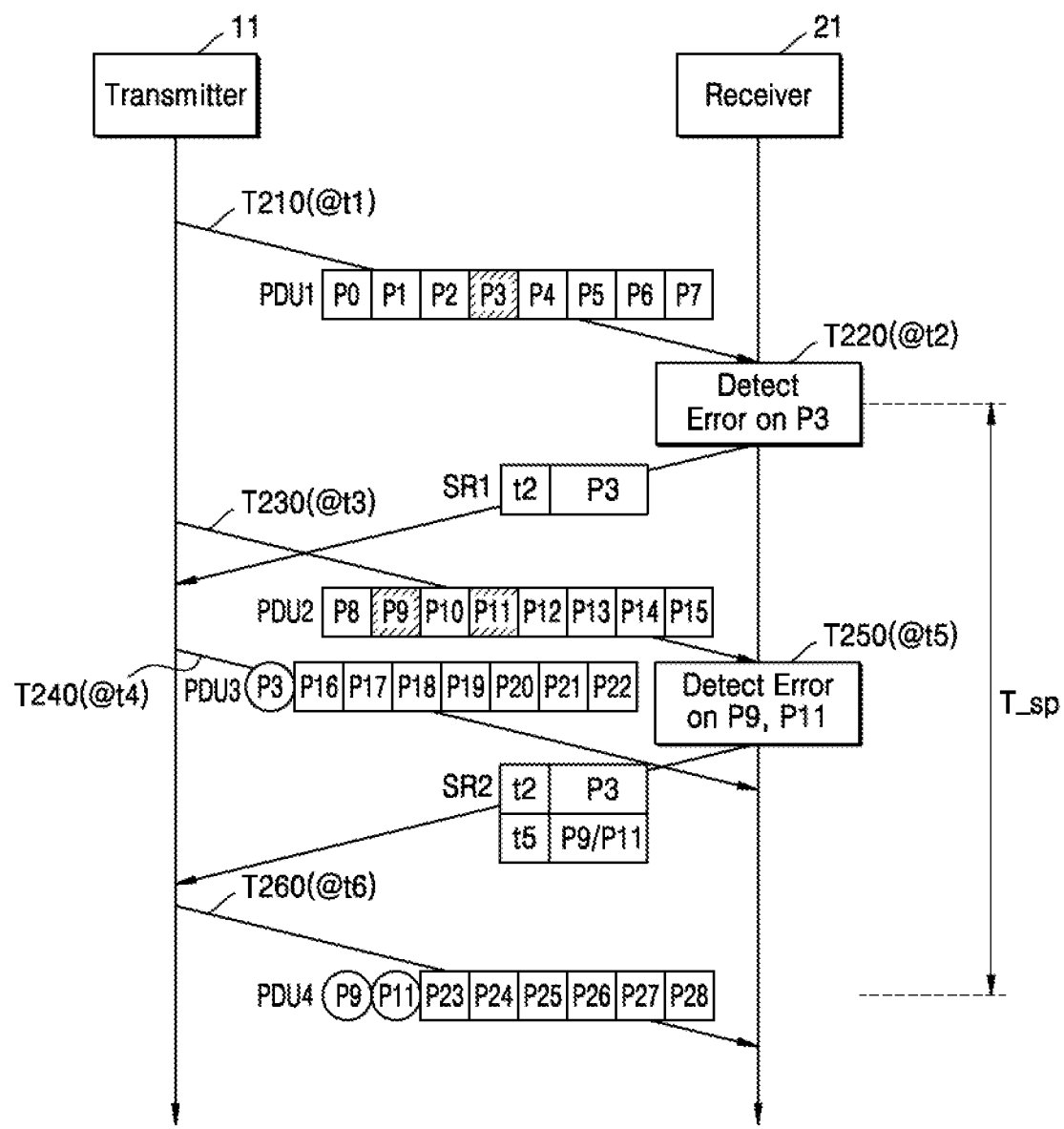
FIG. 6 is a hybrid timing diagram showing a method of operating a communications system, according to an exemplary embodiment.

FIG. 6 illustrates a method of operating a communications system, according to an exemplary embodiment. Specifically, FIG. 6 is a diagram showing a method in which the transmitter 11 and the receiver 21 included in a communications system perform an ARQ operation, according to chronological order. A repeated description of FIGS. 4 and 5 is omitted.

Referring to FIG. 6, at the first system time t1, the transmitter 11 may transmit the first packet unit PDU1 to the receiver 21 at process time T210. The first packet unit PDU1 may include the first packet P0 to the eighth packet P7. At the second system time t2, the receiver 21 may receive the first packet unit PDU1 and may detect an error in the fourth packet P3 of the received first packet unit PDU1 at process time T220. The receiver 21 may transmit the first status report SR1 requesting retransmission regarding the fourth packet P3 to the transmitter 11, and the first status report SR1 may include information regarding the second system time t2 corresponding to a system time in which the first status report SR1 is transmitted. At the third system time t3, the transmitter 11 may transmit the second packet unit PDU2 to the receiver 21 at process time T230. The second packet unit PDU2 may include the ninth packet P8 to the sixteenth packet P15.

At the fourth system time t4, the transmitter 11 may receive the first status report SR1, and in response to the first status report SR1, may retransmit the fourth packet P3 to the receiver 21 by incorporating the fourth packet P3 required for retransmission into the third packet unit PDU3 at process time T240.

At the fifth system time t5, the receiver 21 may receive the second packet unit PDU2 and may detect errors in the tenth packet P9 and the twelfth packet P11 of the received second packet unit PDU2 at process time T250. The fifth system time t5 may be included in the status report processing period T_sp determined as a previously determined period of time starting from the second system time t2 at which the first status report SR1 is output. Although the fifth system time t5 is included in the status report processing period T_sp, the receiver 21 may transmit the second status report SR2 requesting retransmission regarding the tenth packet P9 and the twelfth packet P11 to the transmitter 11, and the second status report SR2 may include not only information regarding the tenth packet P9 and the twelfth packet P11 having occurred at the fifth system time t5 but also information regarding the fourth packet P3 having occurred at the second system time t2.

At the sixth system time t6, the transmitter 11 may receive the second status report SR2, and in response to the second status report SR2, may determine a packet required for retransmission, based on time information. Because the fourth packet P3 has already been retransmitted, the transmitter 11 may retransmit the tenth packet P9 and the twelfth packet P11 to the receiver 21 by incorporating the tenth packet P9 and the twelfth packet P11 required for retransmission into the fourth packet unit PDU4 at process time T260.

FIGS. 7A to 7F illustrate a method of detecting a retransmission packet under various failed packet scenarios, according to an exemplary embodiment.

Figure 7A:
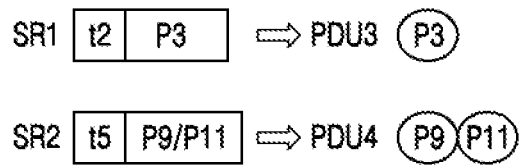
FIGS. 7A to 7F are hybrid data flow diagrams showing a method of detecting a retransmission packet under various failed packet scenarios, according to an exemplary embodiment.

Referring to FIGS. 4 and 7A, the transmitter 11 of FIG. 4 may receive the first status report SR1 including the fourth packet P3 corresponding to the second system time t2 from the receiver 21 of FIG. 4, and in response to the first status report SR1, may retransmit the fourth packet P3 by incorporating the fourth packet P3 into the third packet unit PDU3. Also, a transmitter may receive the second status report SR2 including the tenth packet P9 and the twelfth packet P11 corresponding to the fifth system time t5 from a receiver, and in response to the second status report SR2, may retransmit the tenth packet P9 and the twelfth packet P11 by incorporating the tenth packet P9 and the twelfth packet P11 into the fourth packet unit PDU4.

Figure 7B:
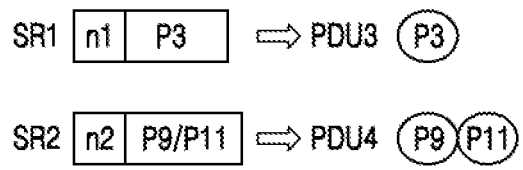

Referring to FIG. 7B, the transmitter may receive the first status report SR1 including the fourth packet P3 corresponding to a first number n1 from the receiver, and in response to the first status report SR1, may retransmit the fourth packet P3 by incorporating the fourth packet P3 into the third packet unit PDU3. Also, the transmitter may receive the second status report SR2 including the tenth packet P9 and the twelfth packet P11 corresponding to a second number n2 from the receiver, and in response to the second status report SR2, may retransmit the tenth packet P9 and the twelfth packet P11 by incorporating the tenth packet P9 and the twelfth packet P11 into the fourth packet unit PDU4.

Figure 7C:
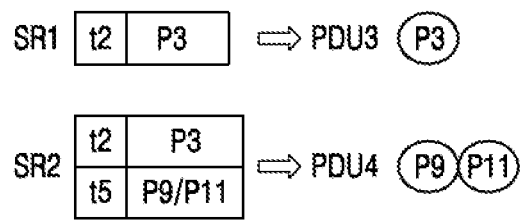

Referring to FIG. 7C, the transmitter may receive the first status report SR1 including the fourth packet P3 corresponding to the second system time t2 from the receiver, and in response to the first status report SR1, may retransmit the fourth packet P3 by incorporating the fourth packet P3 into the third packet unit PDU3. The transmitter may receive the second status report SR2 including the fourth packet P3 corresponding to the second system time t2 and the tenth packet P9 and the twelfth packet P11 corresponding to the fifth system time t5. Based on the second system time t2 and the fifth system time t5, the transmitter may determine the fourth packet P3 as having already been retransmitted, and may retransmit the tenth packet P9 and the twelfth packet P11 by incorporating the tenth packet P9 and the twelfth packet P11 into the fourth packet unit PDU4.

Figure 7D:
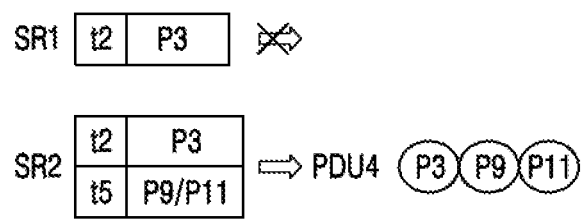

Referring to FIG. 7D, the transmitter may fail to receive the first status report SR1 including the fourth packet P3 corresponding to the second system time t2 from the receiver due to influence of a communication network and may receive the second status report SR2 including the fourth packet P3 corresponding to the second system time t2 and the tenth packet P9 and the twelfth packet P11 corresponding to the fifth system time t5. Based on the second system time t2 and the fifth system time t5, the transmitter may determine the fourth packet P3 as not having been retransmitted, and may retransmit the fourth packet P3, the tenth packet P9, and the twelfth packet P11 by incorporating the fourth packet P3, the tenth packet P9, and the twelfth packet P11 into the fourth packet unit PDU4.

Figure 7E:
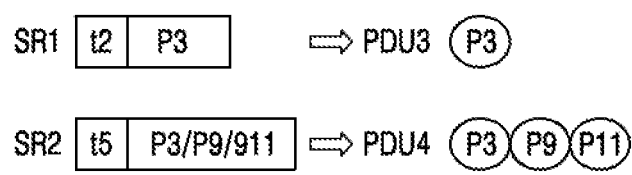

Referring to FIG. 7E, the transmitter may receive the first status report SR1 including the fourth packet P3 corresponding to the second system time t2 from the receiver, and in response to the first status report SR1, may retransmit the fourth packet P3 by incorporating the fourth packet P3 into the third packet unit PDU3. Also, the transmitter may receive the second status report SR2 including the fourth packet P3, the tenth packet P9, and the twelfth packet P11 corresponding to the fifth system time t5 from the receiver. Although the fourth packet P3 has been incorporated into the third packet unit PDU3 and been retransmitted, a time corresponding to the fourth packet P3 included in the second status report SR2 is the fifth system time t5 and is different from that corresponding to the first status report SR1, and accordingly, in response to the second status report SR2, the transmitter may retransmit the fourth packet P3, the tenth packet P9, and the twelfth packet P11 by incorporating the fourth packet P3, the tenth packet P9, and the twelfth packet P11 into the fourth packet unit PDU4.

Figure 7F:
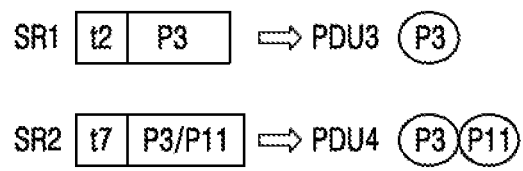

Referring to FIG. 7F, the transmitter may receive the first status report SR1 including the fourth packet P3 corresponding to the second system time t2 from the receiver, and in response to the first status report SR1, may retransmit the fourth packet P3 by incorporating the fourth packet P3 into the third packet unit PDU3. Also, the transmitter may receive the second status report SR2 including the fourth packet P3 and the twelfth packet P11 corresponding to a seventh system time t7 from the receiver. In an example, the seventh system time t7 is a time after a status report processing period, and accordingly, in response to the second status report SR2, the transmitter may retransmit the fourth packet P3 and the twelfth packet P11 by incorporating the fourth packet P3 and the twelfth packet P11 into the fourth packet unit PDU4.

Figure 8:
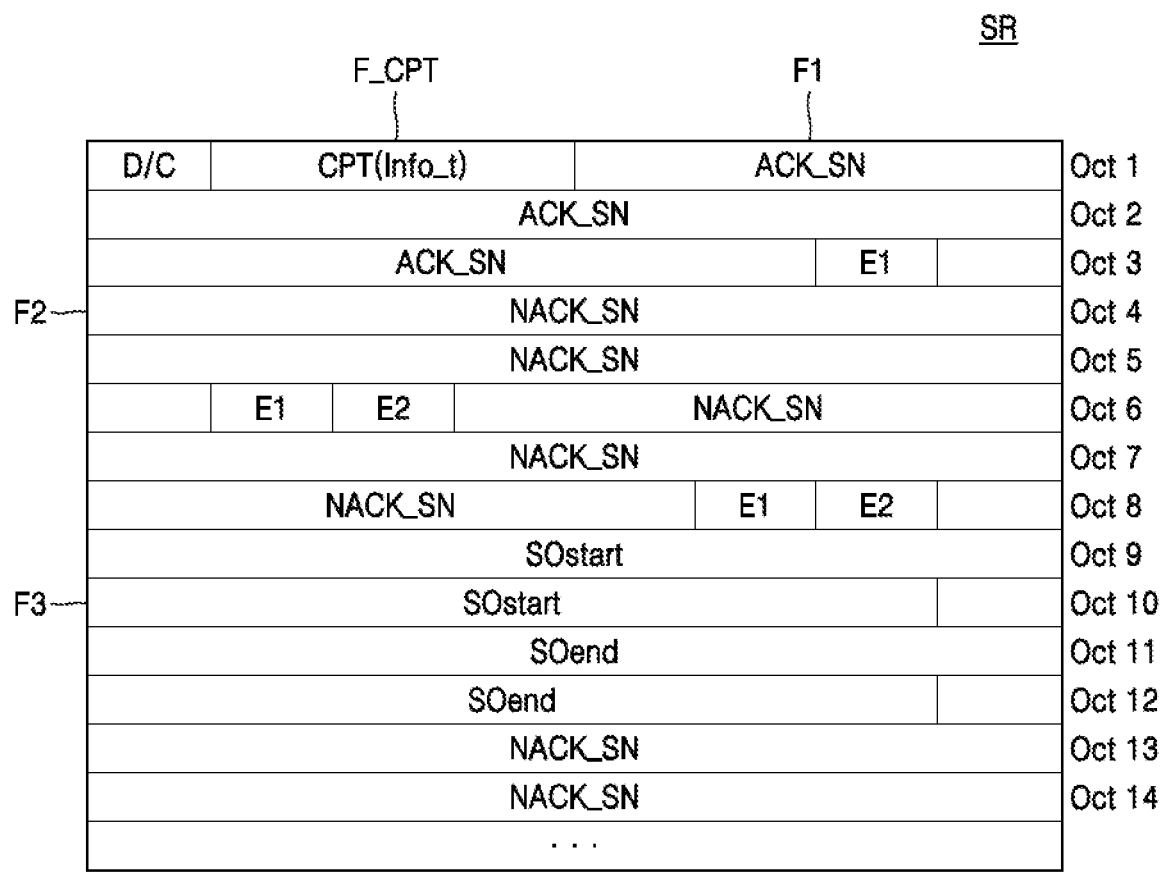
FIG. 8 is a data structure diagram showing a format of a status report according to an exemplary embodiment.

FIG. 8 illustrates a format of a status report SR according to an exemplary embodiment.

Referring to FIG. 8, the status report SR may have a data form of a protocol data unit (PDU) made for transmission in a corresponding layer. For example, the status report SR may include one or more bytes (e.g., Oct1, Oct2, ... , Oct14). A receiver may incorporate a serial number of successfully received data into an ACK_SN field F1 of the status report SR. When the receiver fails to receive data, the receiver may insert a serial number of data into a NACK_SN field F2 of the status report SR and transmit the result to a transmitter. The status report may further include a Segment Offset (SO) field F3, which may indicate the position of the PDU segment, such as in bytes, within the original PDU. The SO field F3 may include SO start information (e.g., a SOstart field), SO end information (e.g., a SOend field), and the NACK_SN field for each failed packet. Referring to FIG. 8 again, for example, the status report SR may further include a D/C field, an E1 field in Oct3, and an E1 field and an E2 field in Oct8. The meaning of these fields can refer to the existing format of a status report, or can be defined differently depending on the specific implementation The status report SR may include a control PDU type (CPT) field F_CPT, and the CPT field F_CPT may indicate a type of a control PDU. According to an exemplary embodiment, time information Info_t corresponding to the status report SR may be incorporated into the CPT field F_CPT. Although not shown, the CPT field F_CPT may include number information indicating a sequential number of the status report SR instead of or in addition to the time information Info_t.

Figure 9:
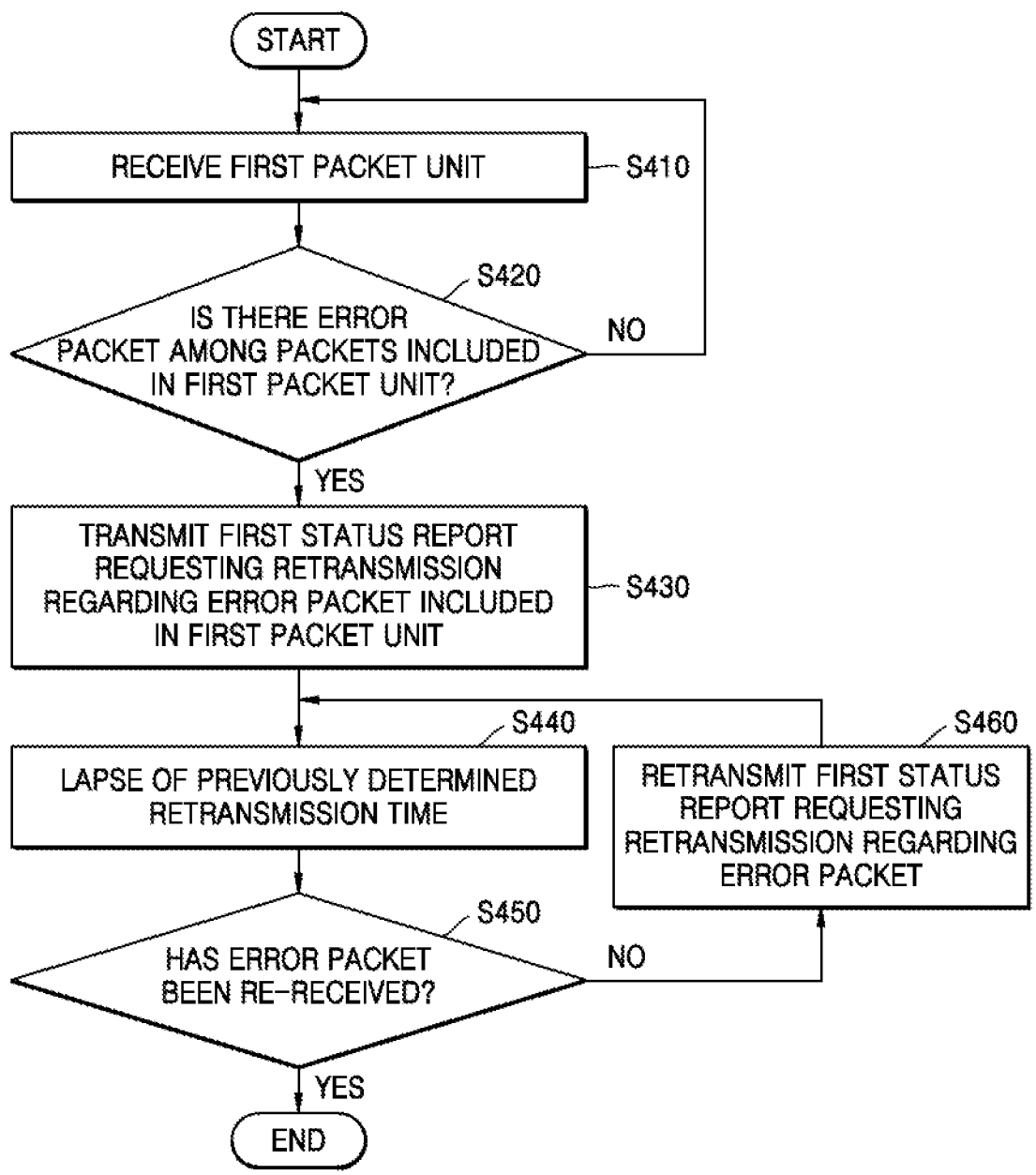
FIG. 9 is a flowchart diagram showing a method of operating a communications device, according to an exemplary embodiment.

FIG. 9 illustrates a method of operating a communications device, according to an exemplary embodiment. Specifically, FIG. 9 is a diagram showing a status report retransmission operation in a case where a communications device serves as a receiver of a packet.

Referring to FIG. 9, a communications device, such as, for example, the BS 10 or the UE 20 of FIG. 1, may receive a first packet unit from a transmitter at operation S410. The communications device may determine whether or not there is a failed packet among packets included in the first packet unit at operation S420.

When there is a failed packet in the first packet unit, the communications device may transmit a first status report requesting retransmission regarding the failed packet included in the first packet unit to the transmitter at operation S430. In an exemplary embodiment, the communications device may incorporate time information corresponding to a time of transmitting the first status report and information regarding the failed packet into the first status report. When there is no failed packet in the first packet unit, the communications device may receive a new packet unit.

Previously determined retransmission time may elapse at operation S440, and the communications device may determine whether the failed packet has been re-received or not in response to the first status report at operation S450. When the failed packet has not been re-received, the communications device may retransmit the first status report requesting retransmission regarding the failed packet at operation S460. In an exemplary embodiment, the communications device may incorporate time information corresponding to a retransmission time of the first status report and information regarding the failed packet into the first status report to be retransmitted.

Previously determined retransmission time may elapse per operation S440, and the communications device may determine whether the failed packet has been re-received or not in response to the first status report per operation S450, and thus, when the failed packet has been re-received, the communications device may finish a status report retransmission operation.

The communications device according to an exemplary embodiment may accomplish reception of a failed packet by repeatedly retransmitting a status report requesting retransmission regarding the failed packet at intervals of a previously determined retransmission time.

Figure 10:
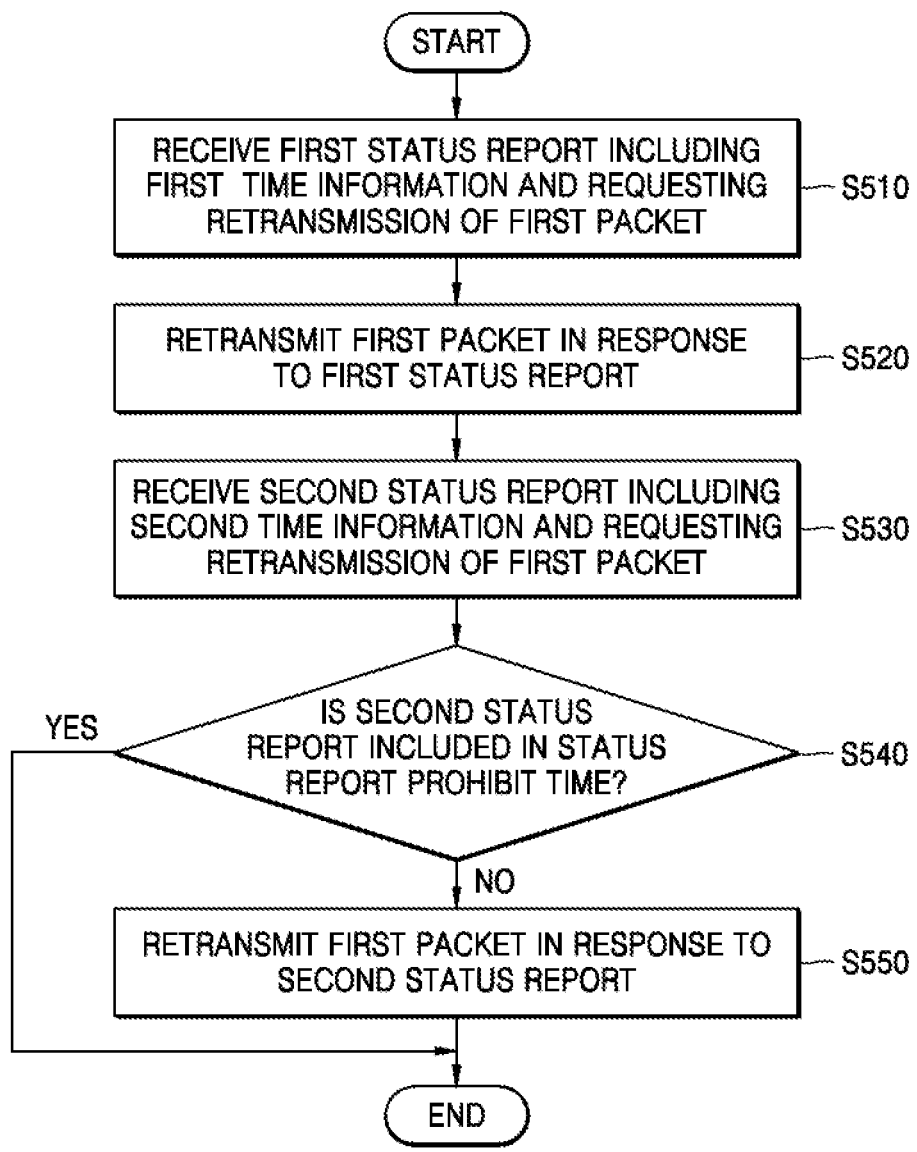
FIG. 10 is a flowchart diagram showing a method of operating a communications device, according to an exemplary embodiment.

FIG. 10 illustrates a method of operating a communications device, according to an exemplary embodiment. Specifically, FIG. 10 is a diagram showing an exemplary embodiment in which a failed packet is retransmitted in response to a status report retransmission operation when a communications device serves as a transmitter of a packet.

Referring to FIG. 10, a communications device, such as, for example, the BS 10 or the UE 20 of FIG. 1, may receive a first status report including first time information and requesting retransmission of a first packet at operation S510. In response to the first status report, the communications device may retransmit the first packet at operation S520.

The communications device may receive a second status report including second time information and requesting retransmission of the first packet at operation S530. Based on the first time information and the second time information, the communications device may determine whether the second status report is included in a status report processing period according to the first status report or not at operation S540. In an example, the communications device may determine whether or not a transmission time of the second status report according to the second time information is included in a previously determined period of time starting from a transmission time of the first status report according to the first time information.

When the second status report is not included in the status report processing period according to the first status report, the second status report is highly likely to be transmitted after the first packet is transmitted to a receiver according to operation S520, and it means that the receiver is highly likely to fail to receive the first packet transmitted according to operation S520. Accordingly, the communications device may retransmit the first packet in response to the second status report at operation S550.

When the second status report is included in the status report processing period according to the first status report, the second status report is highly likely to be transmitted before the first packet is transmitted to a receiver according to operation S520, and it means that the first packet is highly likely to be transmitted to the receiver according to operation S520. Accordingly, the communications device may not retransmit the first packet in response to the second status report.

Figure 11:
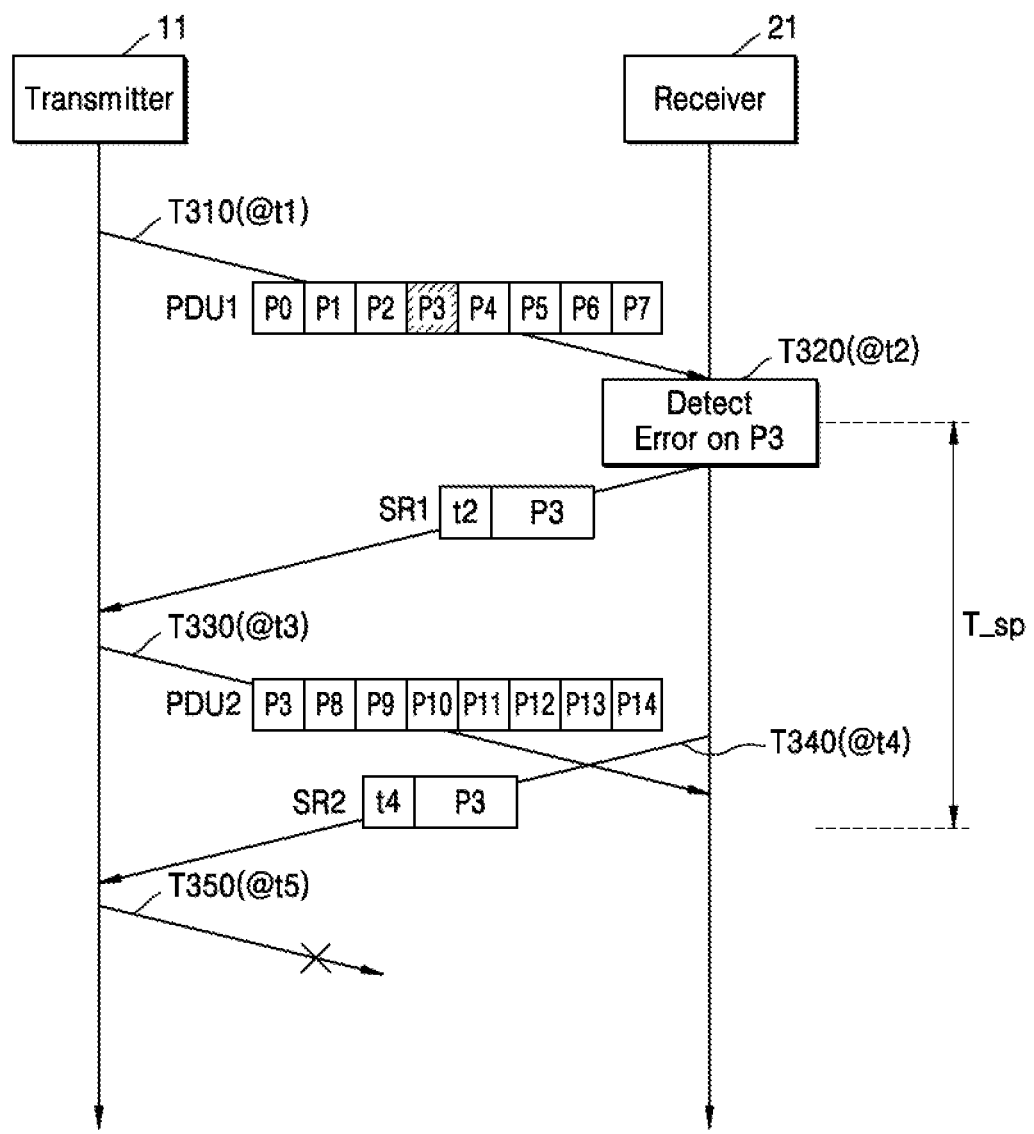
FIG. 11 is a hybrid timing diagram showing a method of operating a communications system, according to an exemplary embodiment.

FIG. 11 illustrates a method of operating a communications system, according to an exemplary embodiment. Specifically, FIG. 11 is a diagram showing a method in which the transmitter 11 and the receiver 21 included in a communications system perform a status report retransmission operation, according to chronological order. A repeated description of FIGS. 4, 9, and 10 is omitted.

Referring to FIG. 11, at the first system time t1, the transmitter 11 may transmit the first packet unit PDU1 to the receiver 21 at process time T310. The first packet unit PDU1 may include the first packet P0 to the eighth packet P7. At the second system time t2, the receiver 21 may receive the first packet unit PDU1 and may detect an error in the fourth packet P3 of the received first packet unit PDU1 at process time T320. The receiver 21 may transmit the first status report SR1 requesting retransmission regarding the fourth packet P3 to the transmitter 11, and the first status report SR1 may include information regarding the second system time t2 corresponding to a system time in which the first status report SR1 is transmitted.

At the third system time t3, in response to the first status report SR1, the transmitter 11 may transmit the second packet unit PDU2 including the fourth packet P3 where an error has occurred to the receiver 21 at process time T330. The second packet unit PDU2 may include the fourth packet P3 requested to be retransmitted and the ninth packet P8 to the fifteenth packet P14.

At the fourth system time t4, the receiver 21 may transmit the second status report SR2 including information regarding the fourth packet P3 to the transmitter 11 to guarantee retransmission regarding the fourth packet P3 after a previously determined time elapses from the second system time t2 at process time T340. The receiver 21 may incorporate information regarding the fourth system time t4 corresponding to a system time in which the second status report SR2 is transmitted into the second status report SR2.

At the fifth system time t5, in response to the second status report SR2, the transmitter 11 may determine, based on the second system time t2 and the fourth system time t4, whether the second status report SR2 is included in the status report processing period T_sp or not at process time T350. Because the fourth system time t4 at which the second status report SR2 is transmitted is included in the status report processing period T_sp starting from the second system time t2, the transmitter 11 may not retransmit the fourth packet P3 in spite of the second status report SR2.

According to an exemplary embodiment, when the second status report SR2 is included in the status report processing period T_sp corresponding to the first status report SR1, the receiver 21 is highly likely to receive retransmission of the fourth packet P3 due to the second packet unit PDU2, and accordingly, the transmitter 11 may not retransmit the fourth packet P3 in spite of the second status report SR2 to prevent duplicate retransmission regarding a signal.

Figure 12:
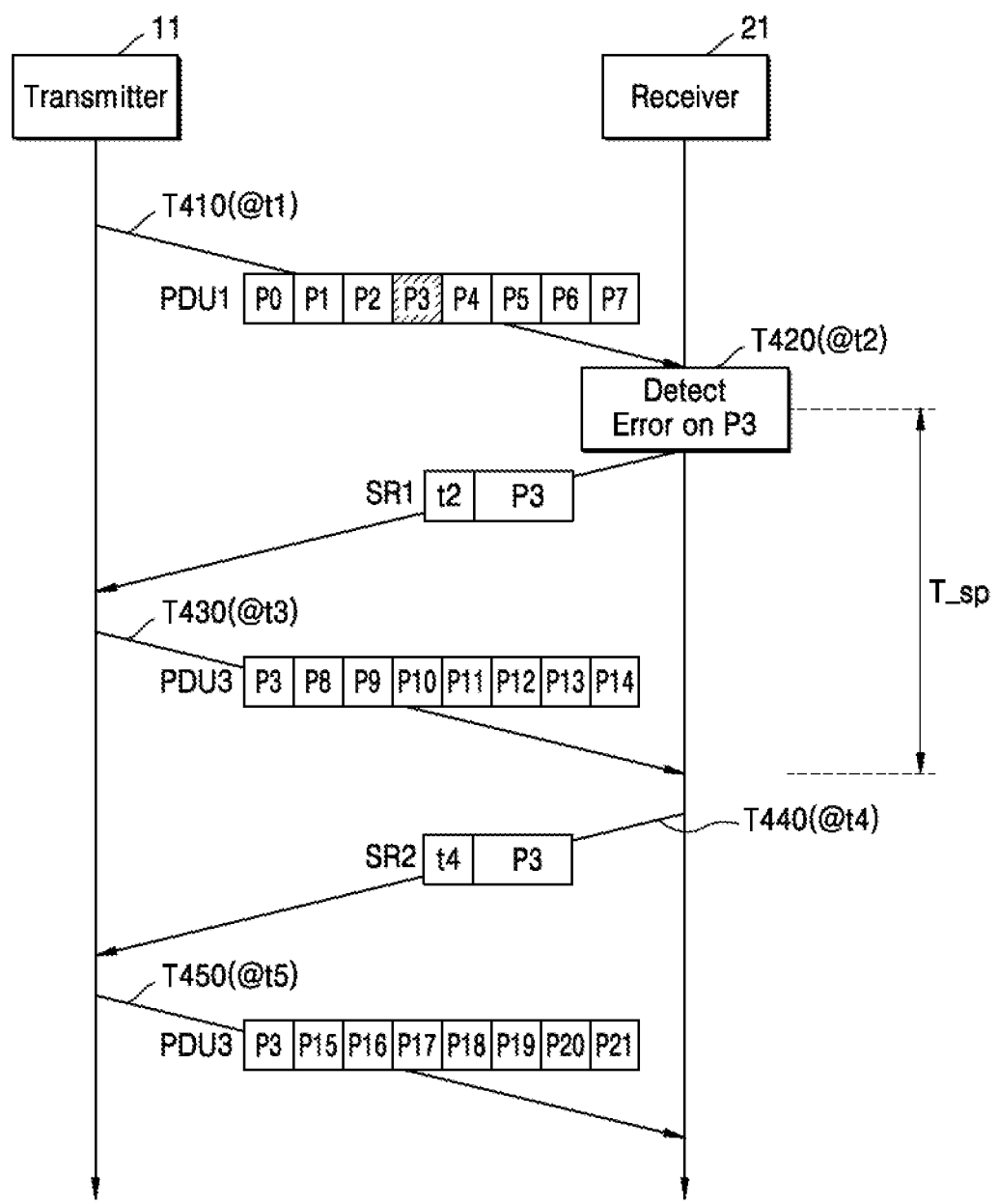
FIG. 12 is a hybrid timing diagram showing a method of operating a communications system, according to an exemplary embodiment.

FIG. 12 illustrates a method of operating a communications system, according to an exemplary embodiment. Specifically, FIG. 12 is a diagram showing a method in which the transmitter 11 and the receiver 21 included in a communications system perform a status report retransmission operation, according to chronological order. Duplicate description of FIG. 12 with respect to FIG. 11 may be omitted.

Referring to FIG. 12, at the first system time t1, the transmitter 11 may transmit the first packet unit PDU1 to the receiver 21 at process time T410. The first packet unit PDU1 may include the first packet P0 to the eighth packet P7. At the second system time t2, the receiver 21 may receive the first packet unit PDU1 and may detect an error in the fourth packet P3 of the received first packet unit PDU1 at process time T420. The receiver 21 may transmit the first status report SR1 requesting retransmission regarding the fourth packet P3 to the transmitter 11, and the first status report SR1 may include information regarding the second system time t2 corresponding to a system time in which the first status report SR1 is transmitted.

At the third system time t3, in response to the first status report SR1, the transmitter 11 may transmit the second packet unit PDU2 including the fourth packet P3 where an error has occurred to the receiver 21 at process time T430. The second packet unit PDU2 may include the fourth packet P3 requested to be retransmitted and the ninth packet P8 to the fifteenth packet P14.

At the fourth system time t4, the receiver 21 may transmit the second status report SR2 including information regarding the fourth packet P3 to the transmitter 11 to guarantee retransmission regarding the fourth packet P3 after a previously determined time elapses from the second system time t2 at process time T440. The receiver 21 may incorporate information regarding the fourth system time t4 corresponding to a system time in which the second status report SR2 is transmitted into the second status report SR2.

At the fifth system time t5, in response to the second status report SR2, the transmitter 11 may determine, based on the second system time t2 and the fourth system time t4, whether the second status report SR2 is included in the status report processing period T_sp or not at process time T450. Because the fourth system time t4 at which the second status report SR2 is transmitted is not included in the status report processing period T_sp starting from the second system time t2, the transmitter 11 may transmit the third packet unit PDU3 including the fourth packet P3 in which an error has occurred to the receiver 21 in response to the second status report SR2. The third packet unit PDU3 may include the fourth packet P3 requested to be retransmitted and the sixteenth packet P15 to a twenty-second packet P21.

According to an exemplary embodiment, when the second status report SR2 is not included in the status report processing period T_sp corresponding to the first status report SR1, the receiver 21 is highly likely to fail to receive retransmission of the fourth packet P3 due to the second packet unit PDU2, and accordingly, the transmitter 11 may retransmit the fourth packet P3 in response to the second status report SR2 to prevent decrease of reliability of signal transmission.

In an alternate embodiment similar to that described above with respect to FIG. 12, sequential status report numbers may be used instead of process time and system time. Duplicate description may be omitted.

Here, the transmitter 11 may transmit the first packet unit PDU1 to the receiver 21, where the first packet unit PDU1 may include the first packet P0 through the eighth packet P7. Next, the receiver 21 may receive the first packet unit PDU1 and may detect an error in the fourth packet P3 of the received first packet unit PDU1. The receiver 21 may then transmit the first status report SR1 requesting retransmission regarding the fourth packet P3 to the transmitter 11, where the first status report SR1 includes information regarding a sequential status report number for the first status report SR1.

In response to receipt of the first status report SR1, the transmitter 11 may transmit the second packet unit PDU2, including the fourth packet P3 where an error had previously occurred, to the receiver 21. The second packet unit PDU2 may include the fourth packet P3 requested to be retransmitted as well as the ninth packet P8 through the fifteenth packet P14.

Next the receiver 21 may transmit the second status report SR2 including information regarding the fourth packet P3 to the transmitter 11 to guarantee retransmission regarding the fourth packet P3. The receiver 21 may incorporate information regarding sequential status report number of the second status report SR2.

In response to the second status report SR2, the transmitter 11 may determine, based on an accounting of the received status report sequential numbers and previously retransmitted failed packets, whether one or more of the failed packets in the second status report have been recently retransmitted. Because sequential number of the second status report SR2 is greater than that of the first status report SR1, the transmitter 11 may transmit the third packet unit PDU3 including the fourth packet P3 in which an error had occurred to the receiver 21 in response to the second status report SR2. The third packet unit PDU3 may include the fourth packet P3 requested to be retransmitted as well as the sixteenth packet P15 through the twenty-second packet P21.

In a further alternate embodiment, the determination by the transmitter as to whether a previously retransmitted failed packet should be retransmitted again is based on, in addition to the sequential status report numbers received, a first time between the time the transmitter sending the first failed packet and the time that the first status report indicative of the first failed packet was received by the transmitter, such that if the first time is less than a second time between the time that the transmitter retransmitting the first failed packet and the time that the transmitter receiving the next sequentially numbered status report indicating the packet has failed again, the transmitter retransmits the failed packet again without regard to any timing information from the receiver.

Thus, according to these alternate embodiments, when a failed packet indicated by the second status report SR2 was either not included in the status report SR1 or not yet retransmitted by the transmitter, the receiver 21 is unlikely to receive retransmission of the fourth packet P3 due to the second packet unit PDU2, and accordingly, the transmitter 11 will retransmit the fourth packet P3 in response to the second status report SR2 to enhance communications reliability.

Figure 13:
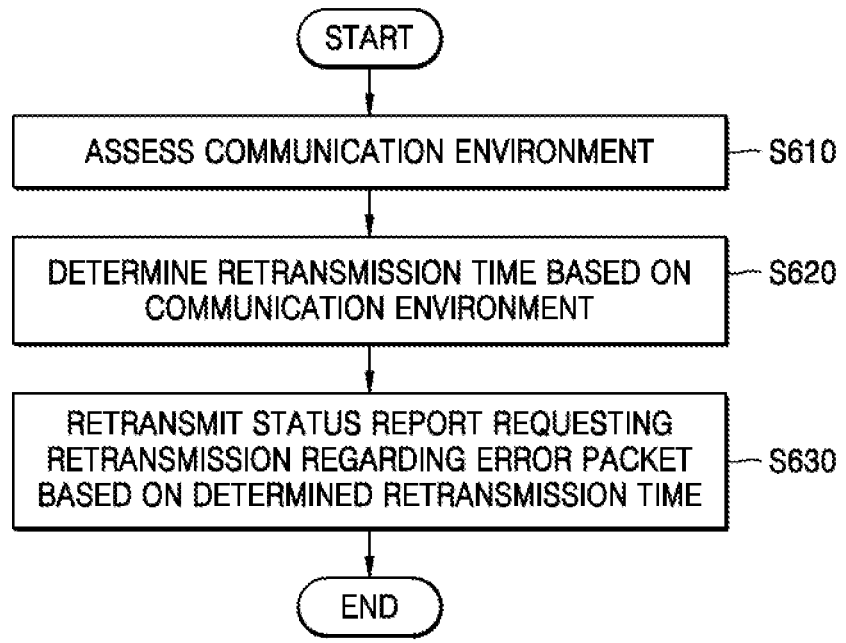
FIG. 13 is a flowchart diagram showing operations of a communications device according to an exemplary embodiment.

FIG. 13 illustrates operations of a communications device according to an exemplary embodiment. Specifically, FIG. 13 shows operations of a communications device for adaptively determining retransmission time. Duplicate description of FIGS. 9 to 12 may be omitted.

Referring to FIG. 13, a communications device, such as, for example, the BS 10 or the UE 20 of FIG. 1, may assess a surrounding communication environment of the communications device at operation S610. In an example, the communications device may assess a communication environment by measuring data throughput with respect to a device for transmitting data.

Based on the communication environment, the communications device may determine retransmission time at operation S620. In an example, the communications device may shorten retransmission time when data throughput is high. For example, when the data throughput is higher than a predetermined value, the communications device may shorten the retransmission time.

Based on the determined retransmission time, the communications device may retransmit a status report requesting retransmission regarding a failed packet at operation S630. In an example, the communications device may determine whether or not a failed packet has been received while the retransmission time elapses from transmission of a previously transmitted status report, and may retransmit the status report requesting retransmission of the failed packet when the failed packet has not been received during the retransmission time.

Figure 14:
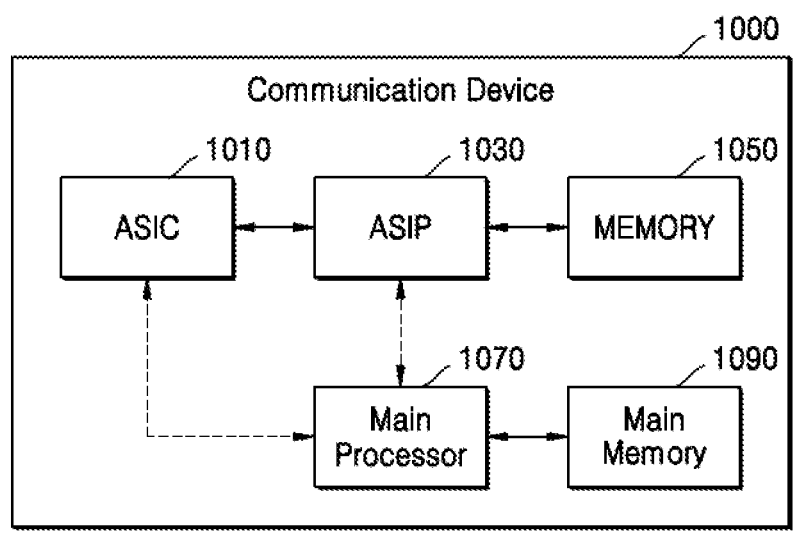
FIG. 14 is a schematic block diagram showing a communications device according to an exemplary embodiment.

FIG. 14 illustrates a communications device 1000 according to an exemplary embodiment.

Referring to FIG. 14, the communications device 1000 may include an application specific integrated circuit (ASIC) 1010, an application specific instruction set processor (ASIP) 1030 connected to the ASIC, a memory 1050 connected to the ASIP, a main processor 1070 connected to the ASIC and the ASIP, and a main memory 1090 connected to the main processor. Two or more from among the ASIC 1010, the ASIP 1030, and the main processor 1070 may communicate with each other. Also, at least two of the ASIC 1010, the ASIP 1030, the memory 1050, the main processor 1070, and the main memory 1090 may be embedded in one chip.

The ASIP 1030, which is an integrated circuit customized for a particular purpose, may support an exclusive instruction set for a particular application and may execute instructions included in the instruction set. The memory 1050 may communicate with the ASIP 1030, and as a non-transitory storage device, may store a plurality of instructions which are executed by the ASIP 1030. For example, the memory 1050 may include any type of memory accessible by the ASIP 1030, such as random-access memory (RAM), read-only memory (ROM), a tape, a magnetic disk, an optical disk, volatile memory, non-volatile memory, or a combination thereof, which are non-limiting examples.

The main processor 1070 may control the communications device 1000 by executing a plurality of instructions. For example, the main processor 1070 may control the ASIC 1010 and the ASIP 1030 and may process data received via a communications network or process a user's input to the communications device 1000. The main memory 1090 may communicate with the main processor 1070, and as a non-transitory storage device, may store a plurality of instructions which are executed by the main processor 1070. For example, the main memory 1090 may include any type of memory accessible by the main processor 1070, such as RAM, ROM, a tape, a magnetic disk, an optical disk, volatile memory, non-volatile memory, or a combination thereof, which are non-limiting examples.

A communications method according to one or more of the above-described exemplary embodiments may be performed by at least one of the components included in the communications device 1000 of FIG. 14. In some embodiments, at least one operation from among operations of the communications method and the signal processor 100 and 300 of FIG. 1 may be implemented as a plurality of instructions stored in the memory 1050. The ASIP 1030 may perform at least one operation from among operations of the communications method and at least some of operations of the signal processor 100 and 300 of FIG. 1 by executing a plurality of instructions stored in the memory 1050. In some embodiments, at least one operation from among operations of the communications method and the signal processor 100 and 300 of FIG. 1 may be implemented as hardware blocks designed through logic synthesis, etc. and be included in the ASIC 1010. In some embodiments, at least one operation from among operations of the communications method and the signal processor 100 and 300 of FIG. 1 may be implemented as a plurality of instructions stored in the main memory 1090, and the main processor 1070 may perform at least one operation from among operations of the communications method and at least some of operations of the signal processors 100 and 300 of FIG. 1 by executing a plurality of instructions stored in the main memory 1090.

While the inventive concept has been particularly shown and described with reference to exemplary embodiments thereof, it will be understood by those of ordinary skill in the pertinent art that various changes in form and details may be made therein without departing from the scope of the inventive concept as more particularly defined by the attached claims and their equivalents.

What is claimed is:

1. A method of operating a communications device, the method comprising:
   sequentially transmitting, by a transmitter, a first packet unit and a second packet unit;
   receiving, by the transmitter, a first status report requesting for the transmitter to retransmit a first failed packet having an error from among at least one first packet comprised in the first packet unit, wherein the first status report includes first time information indicating a time which the first status report is generated, and first packet information indicating the first failed packet;
   retransmitting, by the transmitter, the first failed packet indicated in the first status report, by incorporating the first failed packet in a third packet data unit;
   receiving, by the transmitter, a second status report requesting retransmission regarding a second failed packet having an error from among at least one second packet comprised in the second packet unit, wherein the second status report includes second time information indicating a time which the second status report is generated, and second packet information indicating the second failed packet;
   identifying, by the transmitter, whether the first time information of the first status report precedes the second time information of the second status report; and
   retransmitting, by the transmitter, the second failed packet only when the first time information precedes the second time information.

2. The method of claim 1, further comprising:
   if the first time information precedes the second time information, identifying whether the second failed packet is identical to the first failed packet.

3. The method of claim 2, further comprising:
   if the second failed packet is identical to the first failed packet, calculating a time difference between the second time information and the first time information; and
   if the time difference exceeds a predetermined time duration, transmitting, by the transmitter, the second failed packet which is identical to the first failed packet.

4. The method of claim 3, further comprising:
   if the time difference is less than the predetermined time duration, bypassing, by the transmitter, the second failed packet in the fourth packet unit.

5. The method of claim 4, further comprising:
   if the second failed packet is different to the first failed packet, transmitting, by the transmitter, the second failed packet by including the second failed packet in the fourth packet unit.

6. A communications system comprising:
   a transmitter configured to transmit, to a receiver, a first data packet unit and a second data packet unit; and
   the receiver configured to receive, from the transmitter, the first data packet unit and the second data packet unit,
   wherein the receiver is configured to:
      determine whether there is a first failed packet having an error from among the first data packet unit, and a second failed packet having an error from among the second data packet unit,
      transmit, at a first time, a first status report requesting for the transmitter to retransmit the first failed packet, the first status report including first time information indicating the first time and first packet information indicating the first failed packet, and
      transmit, at a second time, a second status report requesting for the transmitter to retransmit the first failed packet within a predetermined time period from transmission of the first status report, the first status report including second time information indicating the second time and second packet information indicating the second failed packet,
   wherein the transmitter is configured to:
      in response to receiving the first status report, retransmit the first failed packet indicated by the first status report,
      receiving, by the transmitter, the second status report,
      identify whether the first time corresponding to the first status report precedes the second time corresponding to the second status report; and
      if the first time precedes the second time, retransmit the second failed packet.

7. The communications system of claim 6, wherein the transmitter is further configured to:
   identify whether the second failed packet is identical to the first failed packet, if the first time precedes the second time information,
   calculate a time difference between the second time and the first time, if the second failed packet is identical to the first failed packet; and
   transmit the second failed packet which is identical to the first failed packet, if the time difference exceeds a predetermined time duration.

8. The communications system of claim 7, wherein the transmitter is further configured to:
   bypass the second failed packet in the fourth packet unit, if the time difference is less than the predetermined time duration and if the first failed packet is same with the second failed packet, and transmit the second failed packet by including the second failed packet in the fourth packet unit, if the second failed packet is different to the first failed packet and if the first time precedes the second time information.

* * * * *